US009800300B2

(12) United States Patent
Caruana et al.

(10) Patent No.: US 9,800,300 B2
(45) Date of Patent: Oct. 24, 2017

(54) METHOD, CIRCUIT AND CONTACTLESS COMMUNICATION DEVICE WITH ACTIVATED EMITTING

(75) Inventors: Jean-Paul Caruana, La Seyne sur Mer (FR); Christophe Buton, Gemenos (FR); Grégory Capomaggio, Roquevaire (FR)

(73) Assignee: GEMALTO SA, Meudon (FR)

( * ) Notice: Subject to any disclaimer, the term of this patent is extended or adjusted under 35 U.S.C. 154(b) by 208 days.

(21) Appl. No.: 14/111,105

(22) PCT Filed: Apr. 12, 2012

(86) PCT No.: PCT/EP2012/056726
§ 371 (c)(1),
(2), (4) Date: Oct. 10, 2013

(87) PCT Pub. No.: WO2012/140169
PCT Pub. Date: Oct. 18, 2012

(65) Prior Publication Data
US 2014/0030986 A1 Jan. 30, 2014

(30) Foreign Application Priority Data

Apr. 15, 2011 (EP) .................................... 11305453
Apr. 6, 2012 (EP) .................................... 12305408

(51) Int. Cl.
*H04B 7/02* (2017.01)
*G06K 19/077* (2006.01)

(52) U.S. Cl.
CPC ....... *H04B 7/028* (2013.01); *G06K 19/07773* (2013.01)

(58) Field of Classification Search
CPC ............... H04W 4/008; H04M 1/7253; H04M 2250/04
See application file for complete search history.

(56) References Cited

U.S. PATENT DOCUMENTS

| 5,621,913 A | 4/1997 | Tuttle et al. |
| 6,028,503 A * | 2/2000 | Preishuberpflugl .. G06K 7/0008 340/10.4 |

(Continued)

FOREIGN PATENT DOCUMENTS

| EP | 0 926 855 A1 | 6/1999 |
| EP | 1 801 741 B1 | 6/2007 |
| EP | 1 898 342 A2 | 3/2008 |

OTHER PUBLICATIONS

International Search Report (PCT/ISA/210) mailed on Jun. 29, 2012, by the European Patent Office as the International Searching Authority for International Application No. PCT/EP2012/056726.

(Continued)

*Primary Examiner* — Andrew Wendell
*Assistant Examiner* — Maryam Soltanzadeh
(74) *Attorney, Agent, or Firm* — Buchanan Ingersoll & Rooney PC

(57) ABSTRACT

An activated contactless communication circuit includes a device for receiving and transmitting a data-carrying electromagnetic field; a first circuit resonating with a first antenna for receiving data; and a second circuit resonating with a second antenna for transmitting data, the first and second resonating circuits being separate from each other. The transmission is carried out at a frequency phase-synchronized with the frequency of the electromagnetic field for reception.

16 Claims, 4 Drawing Sheets

(56) References Cited

U.S. PATENT DOCUMENTS

| | | | |
|---|---|---|---|
| 6,356,535 B1 | 3/2002 | Smith | |
| 2005/0141600 A1* | 6/2005 | Nomura | G04R 20/08 375/211 |
| 2007/0247352 A1* | 10/2007 | Michael et al. | 342/128 |
| 2010/0188195 A1* | 7/2010 | Busch-Sorensen | G06K 19/07309 340/10.1 |
| 2011/0148588 A1* | 6/2011 | Bacquet | G06K 7/10336 340/10.1 |
| 2011/0279147 A1* | 11/2011 | Montalvo | H04W 56/0035 327/3 |
| 2013/0257599 A1* | 10/2013 | Tseng | G06K 19/073 340/10.5 |
| 2014/0241480 A1* | 8/2014 | Shen | H04L 7/02 375/373 |
| 2016/0294398 A1* | 10/2016 | Verlinden | H03L 7/087 |

OTHER PUBLICATIONS

Written Opinion (PCT/ISA/237) mailed on Jun. 29, 2012, by the European Patent Office as the International Searching Authority for International Application No. PCT/EP2012/056726.

* cited by examiner

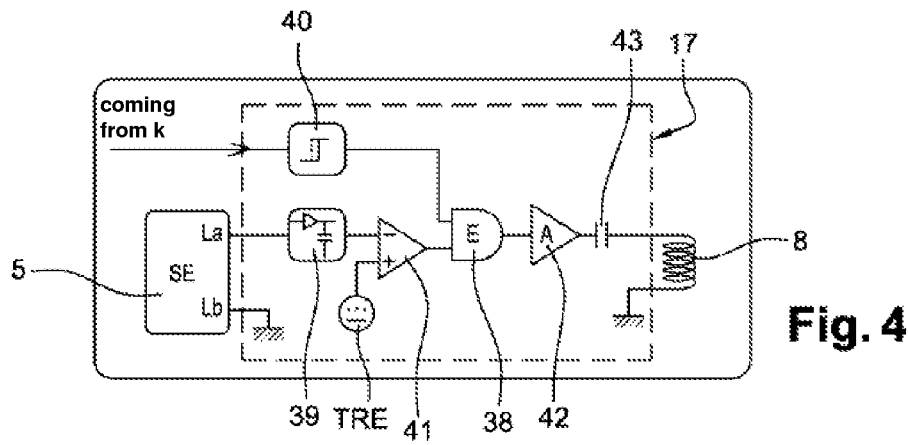
Fig. 4
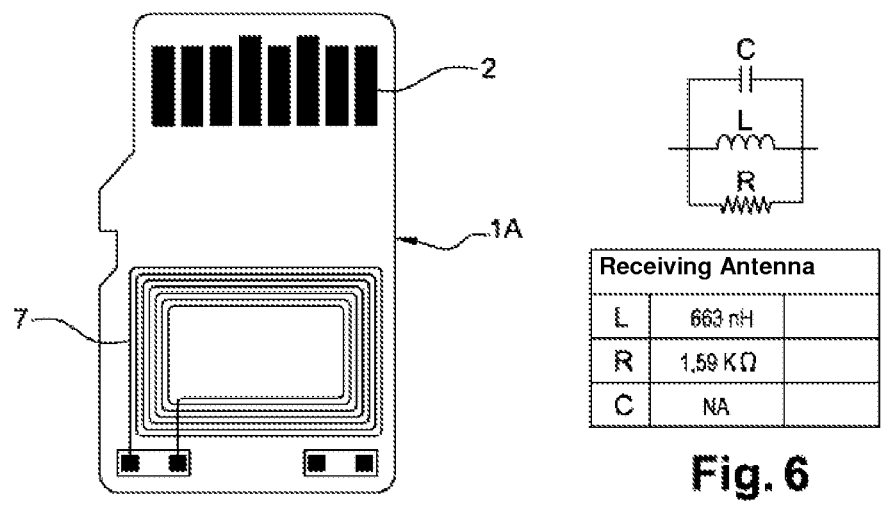
Fig. 5
Fig. 6
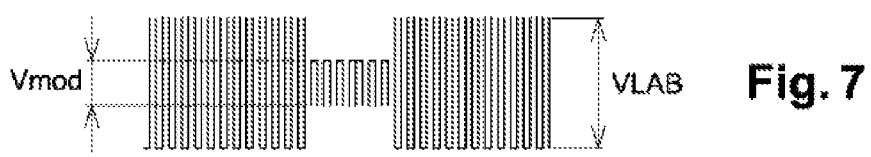
Fig. 7
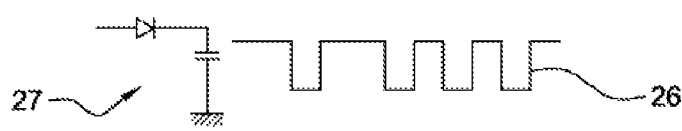
Fig. 8

METHOD, CIRCUIT AND CONTACTLESS COMMUNICATION DEVICE WITH ACTIVATED EMITTING

FIELD OF THE INVENTION

The invention relates to an activated contactless communication method, as well as to a device for implementing same.

The invention aims in particular to indicate the features of the signals, the antennas and the principle of this novel way to use contactless technology. The radiofrequency communication is, in principle, short range and carried out by electromagnetic coupling and induction with a range of the order of 0.01 or 1 m.

The invention can be used in particular in portable electronic objects, for example in memory cards, such as SD cards (by the company SanDisk).

Such cards are currently used in a mobile telephone card interface for performing contactless transactions in compliance mainly with standard ISO/IEC 14443 or 15693, whenever said telephones are not provided with contactless interfaces ex-factory.

PRIOR ART

Existing ISO/IEC 14443 and NFC (Near Field Communication) technology is based on a principle of retro-modulation of a signal transmitted by a reader.

According to said principle, a certain amount of the electromagnetic field supplied by a reader should be modulated by the object with the proximity contactless chip, also referred to as PICC (Proximity Integrated Circuit Card). In order to comply with the sensitivity of the reader, the field should have a minimum field amplitude in order to be modulated by the object.

Said modulation of the reader carrier should generate two sidebands with an amplitude no lower than $22/H^{0.5}$. In order to meet this condition, a minimum coupling must be provided between the reader and the object. The coupling factor depends directly on the surfaces of the reader antenna and of the contactless object.

In the case of a very small contactless object—for example a Micro SD card—the surface of the radiofrequency antenna is extremely small. In addition, this type of object is intended for being installed in a host device such as a mobile telephone. The latter operation further reduces the coupling of the contactless object with the reader due to the metal environment of the telephone.

Patent EP1801741 (B1) describes a method for generating a specific electromagnetic field by a portable data medium (transponder), in which data are transmitted to a reader in an activated communication mode, and in which the reader sees the transmission of the specific electromagnetic field as a modulation of the field of the reader. However, this solution does not appear to be completely described or does not work correctly as described.

In addition, the teaching of this patent is very complicated. The implementation of same requires further electronic components, in particular filters, an oscillator and an NFC component. Moreover, existing NFC controllers require two antennas, one for collecting energy and the other for transmitting/receiving data.

Patent application EP 1 898 342 describes a radiofrequency transponder used in an inventory control system using a plurality of transponders. It includes a first antenna circuit for receiving and a second antenna circuit for transmitting. The transmission signal is derived from the receiving frequency received by the receiving antenna.

The transponder transmits information by modulating a harmonic transmission frequency derived from the carrier frequency of a reader. Said harmonic frequency is a multiple of the carrier frequency, without being synchronised with the carrier frequency.

Patent EP 0 926 855 describes a battery-powered radiofrequency communication transponder. It includes a circuit capable of switching from a receiving mode to a transmitting mode, and vice-versa. The transponder includes a circuit with a microprocessor, a single capacitor and a single antenna, as well as a switching means for forming a parallel receiving circuit LC or a serial transmitting circuit LC according to the selected communication mode. The transponder responds by modulating an external field of the reader with which it is coupled.

The invention aims to find an easier, advantageous to the problem of coupling between a reader and a small object.

SUMMARY OF THE INVENTION

The invention proposes to solve said coupling problem by generating, independently from the reader, at least one of the two sidebands in order for the reader to be able to detect the retro-modulation signal from the contactless object (PICC). The circuit of the invention returns a carrier signal modulated by the response signal by charge modulation of the contactless object. The modulation of said carrier signal is preferably amplified in order to power a transmitting antenna.

The invention provides in particular for generating or extracting a communication carrier frequency from the field of a reader received on an antenna receiving data of the contactless object, and for transmitting a response by modulating said carrier reinjected into a transmission stage including a separate transmitting antenna.

Better communication results are achieved with different tuning frequencies for the transmitting and receiving resonant circuits.

For this purpose, the invention thus relates to an activated contactless communication circuit including a means for receiving and transmitting an electromagnetic field carrying data, a first circuit resonating with a first antenna such as to receive data and a second circuit resonating with a second antenna such as to transmit data, said first and second resonant circuits being separate from one another.

The circuit is characterised in that said transmission takes place at a frequency that is phase-synchronised with the frequency of the receiving electromagnetic field.

According to other features of the circuit:

The synchronised transmitting means (17) is configured such as to modulate a carrier signal derived or extracted from an electromagnetic field for receiving data.

The circuit is configured such as to communicate according to at least one of the standards ISO/IEC 14443, 15693 or 18092.

The circuit includes a contactless chip and a stage for adapting the transmission configured such as to amplify a response signal of the chip prior to injection into said second transmitting antenna.

The adaptation stage performs an "AND" logic function in order to combine a carrier signal and a response signal prior to amplification.

Said antennas are arranged together such that the mutual inductance thereof is minimised in particular by a separation or attenuator. The mutual inductance thereof is preferably at least partially cancelled out in order to have negligible current induction in the receiving antenna caused by the transmitting antenna.

The antennas can overlap one another partially in order to totally cancel out the current induced in the receiving antenna by the transmitting antenna. The antenna arrangement makes it possible to minimise a coupling interaction between the antennas, which is responsible for reciprocal or mutual interference. An active current produced in the receiving antenna induces an untimely signal in the receiving antenna. This arrangement makes it possible to avoid a processing step and/or electronic filters which may be used as an alternative to said preferred arrangement.

The receiving antenna is part of a parallel resonant circuit and/or the transmitting antenna is part of a serial resonant circuit. The parallel resonance of the receiving circuit makes it possible to raise the voltage collected by the antenna, which is an advantage for detecting data; on the other hand, the serial resonance of the transmitting circuit makes it possible to inject a strong current into the transmitting coil despite a low operating voltage, which is the case in particular with a Micro SD card.

The circuit includes a contactless chip intended for receiving a receiving signal and a stage for adapting the reception intended for adapting the receiving signal to the specifications of the chip. The reception adaptation stage can be configured to extract a synchronised carrier signal from the receiving signal.

The circuit is installed in or makes up an object having the form factor of an integrated circuit card or is very small, such as a Micro SD card or another component. The circuit can have at least one connector corresponding to that of an object configured such as to connect a host device. Thus, devices that do not include the contactless function can be provided by means of the invention.

The circuit is arranged such as to deactivate the first resonant circuit with a first antenna while the second resonant circuit with a second antenna is active, and vice-versa.

The circuit includes a phase-locked loop PLL which makes it possible to conserve the clock of the incident field artificially when the parallel resonant circuit is uncoupled.

The first and second antennas can make up a single antenna.

The resonant circuits have substantially different tuning frequencies for receiving and transmitting, centred around 13.56 MHz and 14.4 MHz, respectively.

The invention also relates to an activated contactless communication method including steps of receiving and transmitting an electromagnetic field carrying data, the step of receiving data being performed by a first circuit resonating with a first antenna and the step of transmitting data being performed by a second circuit resonating with a second antenna, said first and second resonant circuits being separate from one another.

The method is characterised in that said transmission takes place at a frequency that is phase-synchronised with the frequency of the receiving electromagnetic field.

The invention ensures good coupling between a reader and a PICC object (SD card). In addition, it is easy to implement with minimal modification. The invention relates in particular to any standard dual-interface chip (with or without oscillator).

BRIEF DESCRIPTION OF THE FIGURES

FIG. 4 shows an embodiment of a transmission stage of FIG. 2;

FIGS. 5 and 6 show a receiving antenna arranged relative to a Micro SD card and equivalent circuit values of the antenna;

FIG. 7 shows the level of modulation by the radiofrequency component SE (5);

FIG. 8 shows a filter for extracting the response signal of the component 5 from the carrier of the preceding figure;

DETAILED DESCRIPTION

Activated communication is understood to refer to contactless communication wherein the response of a transponder is provided by transmitting an electromagnetic field that is specific to the transponder, preferably amplified. Said transmission is actually obtained by transmitting, with predetermined power, a carrier signal modulated by a signal of the transponder.

The amplification and/or operation energy of the transmitting/receiving transponder is preferably provided by an external power source that is separate from the reader.

The communication or the contactless circuit typically comply with standard ISO/IEC 14443 and/or ISO/IEC 15693 or any other protocol based on an electromagnetic field activation frequency of 13.56 MHz. The circuit is powered by a current source.

Figure 1:
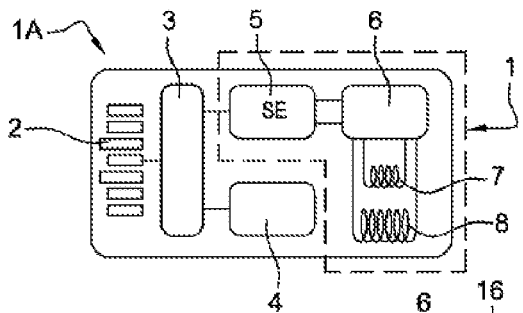
FIG. 1 shows an SD card including the circuit according to one embodiment of the invention.

FIG. 1 shows an example of an embodiment of a contactless communication circuit 1 according to the invention provided in a memory card 1A. However, any other communication-enabled object can, in principle, be provided with such a card, for example a USB drive, a PCMCIA card, a telephone, a PDA, a computer, etc.

The object can optionally be removable from a host device or permanently attached thereto, in particular soldered to the printed circuit card. The circuit or the object can, if need be, provide connections to external antennas instead of supporting same.

The memory card 1 includes, in a known manner, contact studs 2, a microcontroller 3, and a Flash memory 4 (NAND) connected to the microcontroller. The card also includes a communication processing element 5. The card is preferably of the dual-interface type (configured such as to manage contact communication—for example ISO 7816-3—and contactless communication—ISO-14443 (SE)). Said component or element 5 (SE) is preferably secured, like an integrated circuit chip known in the field of chip cards. It can be provided, if need be, with cryptographic, anti-fraud and/or anti-intrusion functionalities, among others.

The component SE is connected to the microcontroller 3 by an input/output port. The security component SE is connected to an active CL interface circuit 6. Said component 6 comprises two antennas 7 and 8, for receiving and transmitting, respectively.

In principle, the invention can be seen to include an additional RF means 6, 7, 8 added to the contactless element SE in order to make up for the particularly small size of the antenna, since it is housed in a Micro SD or Mini SD card or in an object of a substantially similar size.

According to one feature of an embodiment of the invention, the transmission means 5, 6, 7, 8 is configured such as to modulate a carrier signal 25. Said carrier signal in this case is preferably derived or extracted from the magnetic field received from an external reader.

In the example, the radiofrequency circuit 6 performs functional activities of receiving and transmitting the electromagnetic field described below. In particular it picks up the external radiofrequency field RF from a contactless reader such as to, if necessary, make said field compatible with the secured component SE (voltage, etc.). It amplifies the response of the secured element SE intended for being picked up by the external reader.

Figure 2:
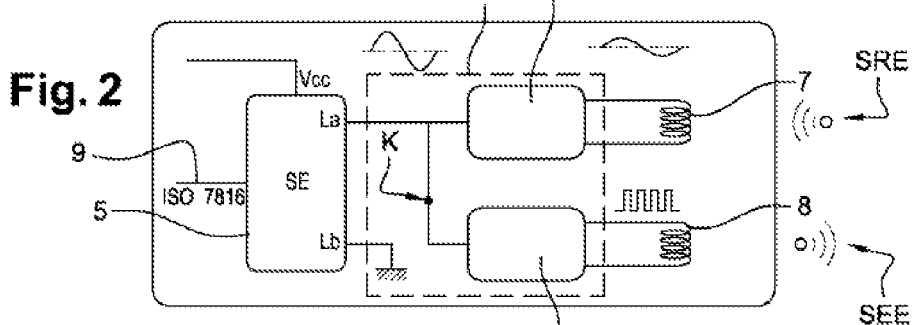
FIG. 2 shows a more detailed view of the radiofrequency circuit RF of the preceding figure.

FIG. 2 describes the component SE (5) and the connections thereof in greater detail. The circuit SE of said embodiment includes a means for connecting to an external power source.

In the example, the component SE includes a contact interface, for example in compliance with standard ISO-7816, symbolised by a connection bundle 9, which includes a supply stud Vcc, and studs La, Lb respectively connected to an active interface 6 and to the earth. The component SE is configured such as to modulate an impedance charge in response to the reception of contactless frames received on the studs La, Lb thereof.

The active interface 6 includes a circuit 16 for conditioning the reception signal SRE and a circuit 17 generating pulses for transmitting a transmission signal SEE. Each circuit 16, 17 is connected to the stud (La) of the processing component 5.

According to one embodiment of the invention, the transmission means 5, 17 is configured such as to modulate a carrier signal. The carrier signal is preferably the result of a derivation or extraction of the received magnetic field SRE.

Clock and Data Reception

According to one embodiment, the method includes a step of receiving the carrier frequency generated by the reader.

The carrier frequency is received by a dedicated receiving antenna 7. The antenna 7 actually receives the electromagnetic field transmitted by the reader including the modulated carrier frequency.

In the example, the frequency is 13.56 MHz, but it could be any other according to the type of communication or protocol, using said 13.56 MHz frequency as the basis for a short or medium range, in particular less than 10 m, 1 m or 0.1 m, even close to 0.

However, the invention does not exclude the possibility of generating a carrier signal by any other means, for example according to a clock signal or an internal signal of a host device or of the object.

Said receiving step also aims to collect the data sent by the reader to the contactless object. An electronic stage including a dedicated receiving circuit can be produced for said purpose, in particular in order to adapt the voltage.

The method can also implement a step of adaptation by means of a reception adaptation stage (16) in order to adapt the reception signal SRE to the chip 5. In this stage, the method can, cumulatively or in alternation, extract the synchronised carrier signal 25 from the reception signal SRE.

Figure 3A:
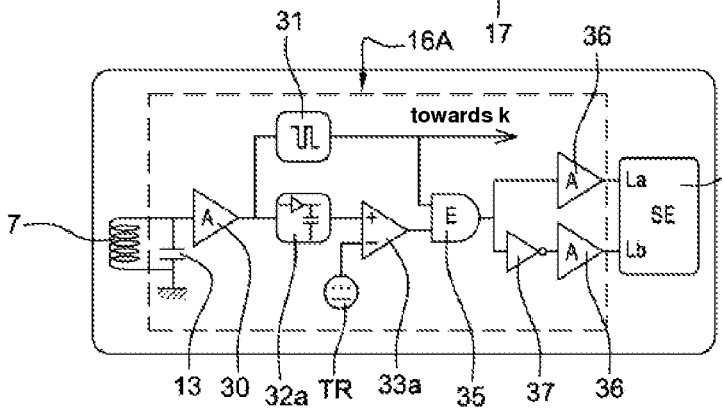
FIG. 3A shows a first embodiment of a receiving stage of FIG. 2.

FIG. 3A shows a first detailed embodiment 16B of the stage 16. The receiving stage 16A includes the receiving antenna 7, which in this case is connected to stud 'La' of the chip via the receiving circuit described below.

The signal received by said antenna can be amplified before extracting the clock signal corresponding to the signal of the carrier. For this purpose, the circuit includes an amplifier 30 connected to the antenna and a clock extractor 31 is connected to the output of said amplifier.

The clock signal 25 obtained at the output of the extractor is sent via a link (K) to a pulse-generating circuit or transmission-adaptation stage 17 described in detail in FIG. 4. The output of the clock extractor 31 is furthermore also connected to a logic circuit 35 performing an "AND" function.

The stage 16A in this case also includes a demodulator 32a receiving the receiving signal SRE amplified by the amplifier 30 connected to a comparison circuit 33a in order to compare the demodulated signal obtained with a reference voltage (TR).

Then, the comparator output signal 33a is combined with the clock signal 25 from the clock extractor 31 in a component 35 performing an "AND" logic function. A first branch of the output of the component 35 can pass through an amplifier 36 before being injected into the stud 'La' of the chip 5.

A second branch of the output of the component 35 can pass through an inverter and then an amplifier 36 before being connected to the stud 'Lb' of the chip.

Figure 3B:
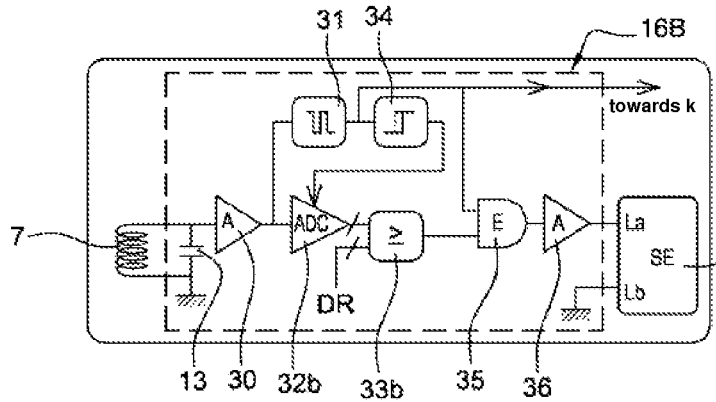
FIG. 3B shows a second embodiment of a receiving stage of FIG. 2.
Figure 9:
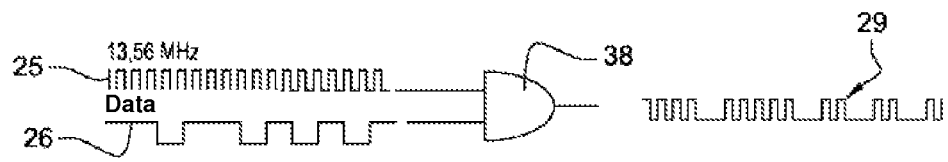
FIG. 9 shows a circuit combining the carrier and the response signal only.

FIG. 3B shows a second embodiment 16B of said stage 16 in which the component 5 used is also a chip with dual contact and contactless interface (combi). The same numbers from one figure to the next depict identical or substantially similar features.

In this embodiment, the clock extraction circuit is also connected to a phase shifter 34 before engaging with the analog-to-digital converter 32b.

The receiving stage or circuit 16B is connected by one end to the receiving antenna 7, which in this case is connected to stud 'La' of the chip. The circuit 16B can include a capacitor 13 arranged on the terminals of studs 'La' and 'Lb' of the chip. This capacitor makes it possible to achieve a good quality factor. The resonant circuit of the receiving antenna is based on the parallel circuit principle.

Unlike in the circuit 16A, the demodulator 32a is replaced with an analog-to-digital converter 32b, the comparator 33a is replaced with a digital comparator 33b having a digital reference value (DR) and the stud 'Lb' is connected to the earth instead of receiving the "AND" output signal of the circuit, inverted and amplified by an inverter 37 and an amplifier 36, respectively.

In addition, said circuit includes a phase shifter 34 on an output branch of the clock extractor 31. Said phase shifter is then connected to the analog-to-digital converter 32b.

Thus, said stages 16A or 16B each make it possible to extract the clock signal 25 and to adapt the signal to the chip 5. After reception and amplification, the carrier signal is directed towards the RF input of the combi chip 5 using the interface studs La/Lb. An additional capacitor 18 can be added to the interface in order to adapt the input impedance.

The electronic stages 16A and 16B operate as follows:

The signal SRE received by the antenna 7 can be quite weak considering the small coupling surface of the antenna 7 in a medium such as a Mini SD card.

Said signal is amplified by the amplifier 30 prior to being demodulated by the demodulator 32a or analog-to-digital converter 32b. A useful signal extracted and calibrated by the comparator is combined by the (AND) gate 35 with the clock signal extracted by the clock extractor 31. At the output of the gate 35, the reconditioned radiofrequency signal is injected into the component 5 after being amplified in differential mode previously by means of the inverter 37 and the amplifiers 36.

At the same time, the power supply Vcc of the chip on the contact side ISO 7816 can be deactivated by a suitable circuit (not shown) during the presence of an electromagnetic field SRE. Said latter circuit can be included in the circuit 16A or 16B. The activation can be manual.

The components (30, 36, 32a, etc.) of said circuits can preferably be powered by voltage from the contacts 2 in relation with a host device.

The circuit 16B has substantially similar operation. However, the phase shifter 34 makes it possible accurately to adjust the activation of the radiofrequency signal acquisition in order to convert the envelope of the received signal into a digital signal via the converter 32b.

The "combi" chip 5 can be powered by the ISO/IEC 7816 contact studs Vdd and Vss thereof, and can optionally use power supplied by the field according to the use and electronic assembly of the invention. The chip can also be supplied by a voltage, generated in the image of the RF field, or by the actual circuit 16, powered by the contacts 2 of a host device.

The advantage of this latter option is that the power supply of the component 5 can be managed by the stage 16 according to whether or not the field is present and, if need be, the chip 5 can be reset.

At this stage, the voltage amplitude VLab is at least 3.3 Vpp (peak-to-peak volts). This value is necessary in order for the chip of the example to detect the 13.56 MHz clock and be able to extract data from the reader.

By way of example, the following table shows the voltage that two existing chips—P5CD072 by Philips/NXP or 66CLX800 by the company Infineon—require in order to detect the clock and the data from the external field.

| Chip | Contactless chip V DC = 3 V | Contactless chip V DC = 2.7 V |
| --- | --- | --- |
| Vmin (Vpp) | 3.48 | 3.53 |
| Vmax (Vpp) | 6.87 | 6.22 |
| Duty cycle (%) | 7.7 | 7.7 |

Receiving Antenna (FIG. 5, 6)

The receiving antenna 7 is as wide as possible within the limit of the surface available in the object.

In the context of a surface available on a Micro SD card, the results presented below were used. The inductance is preferably selected such as to be tuned by a low-value additional capacitor in order to limit the size of the capacitor.

The receiving antenna can, for example, have a surface area of 5×5 mm$^2$ and include 4 to 6 turns. The antenna can be adjusted to 13.56 MHz with a quality factor Q of 10. A parallel circuit can be selected such as to obtain a maximum voltage on the terminals of the antenna circuit. The following antenna specifications have been selected with the equivalent circuit of FIG. 6, wherein L=663 nH, R=1.59 KΩ, and C is not applicable.

The performance of the antenna measured with such an antenna using the equivalent diagram of FIG. 6 is provided in the table below.

| Ls = 663 nH, Rs = 1.59 KΩ, C1 = 180 pF, C2 = 18 pF, Rc 270 KΩ, Cp = 9.5 pF, Rp = 1 MΩ. | |
| --- | --- |
| Field intensity | Contactless chip V DC = 2.7 V |
| 1.5 A/m | 1.01 Vpp |
| 4.5 A/m | 3.00 Vpp |
| 7.5 A/m | 5.09 Vpp |

The voltage expected with this antenna is higher than 1 Vpp (peak-to-peak volts). The minimum field creates a voltage of more than 1 Vpp, not enough to enable the combi chip 5 to detect the signal. This is why an amplification stage was preferably added to the embodiment with a Micro SD card. Said amplification stage for receiving the clock is, in this case, higher than 10 dB, the voltage gain being equal to 3. This amplification may not be necessary in other circumstances or with other chips.

The output level of the conditioning stage 16 is from 3 Vpp to 14 Vpp. The gain can be from 5 dB to 20 dB.

The chip can be switched off or reset by any means, such as a switch in the host device or on the power circuit of the chip. The chip resets automatically when it is powered up.

Sideband and Modulation (FIG. 7-10)

In the example (FIG. 9), when the combi chip 5 receives the carrier signal (or the carrier) as well as the data signal via the studs La/Lb thereof, it generates a charge modulation signal in order to send a response to the device or terminal with which it communicates.

The amplitude of the modulation signal Vmod in this case is around half the amplitude of the carrier VLAB when the capacitor is correctly adjusted.

A capacitor of 10 to 60 pF at the terminals of the points La, Lb of the chip can be used for this purpose. This value can vary according to the type of chip. Thus, VLAB and Vmod voltages are obtained which are equal to 3.3 peak-to-peak volts and 1.6 peak-to-peak volts, respectively.

In this step, two options are possible. The first most straightforward option is to use said signal as presented and then, preferably, to amplify same in a high-power amplification stage prior to injecting the signal into a circuit for adapting or adapting the transmission 17 upstream from the transmitting antenna 8. Different amplification means which are known in the prior art can be used.

In another example (FIG. 8), in accordance with a second option, the carrier signal for the transmission is eliminated in order to keep the digital data 25. For this purpose it is possible to use, for example, a low-pass filter 27 of FIG. 8.

Subsequently (FIG. 9), modulation is carried out, preferably to 100% by combining the data signal 25 with a carrier 26 at 13.56 MHz. This can be done with the assistance of the (AND) logic gate 38 or an amplifier buffer 42 or a transistor assembly performing the same function. After power amplification, the obtained signal 29 is used to power the output antenna 8.

Thus, rather than amplifying the assembly including the carrier 25 and the signal 26 or the carrier only 25 even when there is no signal, the invention provides for amplifying the signal and the carrier only when there is a response signal. For example, in the present case in FIG. 9, the useful signal 29 is amplified when the data signal has a high level. When there is no signal (data line at a level of zero or near zero), no signal comes out of the gate 38. There is no amplification or waste of energy of the carrier only prior to powering the transmitting antenna.

FIG. 4 shows a relatively straightforward preferred embodiment which makes it possible to obtain good results by partially implementing the second option. According to said preferred option, the adaptation stage 17 includes an "AND" logic gate 38 or an equivalent circuit for combining a carrier signal 26 (FIG. 9) and a response signal 25 or transmission signal of the chip 5 prior to amplification.

In greater detail, in the circuit 17, the stud 'La' of the chip 5 is connected to a demodulator 39 (which can be of the same type as the circuit 27 or 2a) in order to receive a modulated response signal from the chip 5. Then, the output of the demodulator 39 connects a comparator 41 which compares the received voltage level with a reference voltage level (TRE) in order to digitise the useful signal. The output of the comparator 41 carrying the useful response signal of the chip 26 is connected to one of the inputs of the component 38 performing the "AND" logic function in order to combine the carrier signal 25 with the response signal 26 of the chip.

The carrier 25 comes from the point K of the stage of adapting the reception and extraction 16A or 16B. The carrier is injected via a link to the other input stud of the component 38 performing the "AND" logic function. The clock signal is preferably phase-shifted by a phase shifter 40 such as to synchronise or lock the clock signals optimally with the carrier of the radiofrequency signal generated by a reader device in order to produce maximum retro-modulation. The transmission frequency of the circuit of the invention is thus phase-synchronised with the frequency of the field transmitted by the reader.

The circuit 17 preferably includes an amplifier or buffer circuit 42 for amplifying the signal 29 at the output of the component 38 before injecting same into the transmitting antenna 8.

The antenna circuit used forms a serial resonant circuit with a capacitor 43.

Certain components of the stage 17 can preferably be powered, for the operation thereof, by a power source from the host device via the contacts 2.

Other sources which are known in the prior art are not excluded.

The circuit 17 operates as below. After the chip has received radiofrequency frames SRE which have preferably been previously reconditioned on the points La, Lb thereof, the response of the chip by charge modulation is received and demodulated in the demodulator 39. Then a useful signal is digitised by the threshold comparator 41 before being injected into the (AND) circuit 38 and combined with a carrier 25 extracted or derived from the received field SRE from the point K. If need be, the circuit 17 can include a clock extractor similar to 31 collecting the signal as in FIG. 16A or 16B.

The response signal 29 from the circuit 38 is then amplified, preferably by the amplifier 42, before being injected into the transmitting antenna with serial resonance 8.

Power of the Output Buffer Amplification

In order to make up for the small surface of the transmitting antenna in the SD card (or other substrate), an output buffer amplifier 42 can be used, which preferably produces a minimum current of 60 mA to 80 mA with the supply voltage provided. Good results are obtained with a power of more than 200 mW.

One advantage of said treatment is, in particular, limiting the power consumption of the amplification when no response signal is received from the chip 5. It is, indeed, pointless to amplify the signal of the carrier only when there is no response or signal to be transmitted in the foreseen application.

Figure 10:
FIG. 10 shows a circuit LC relative to the transmitting antenna.

Output Antenna & Frequency Tuning (FIG. 10, 11)

Figure 13:
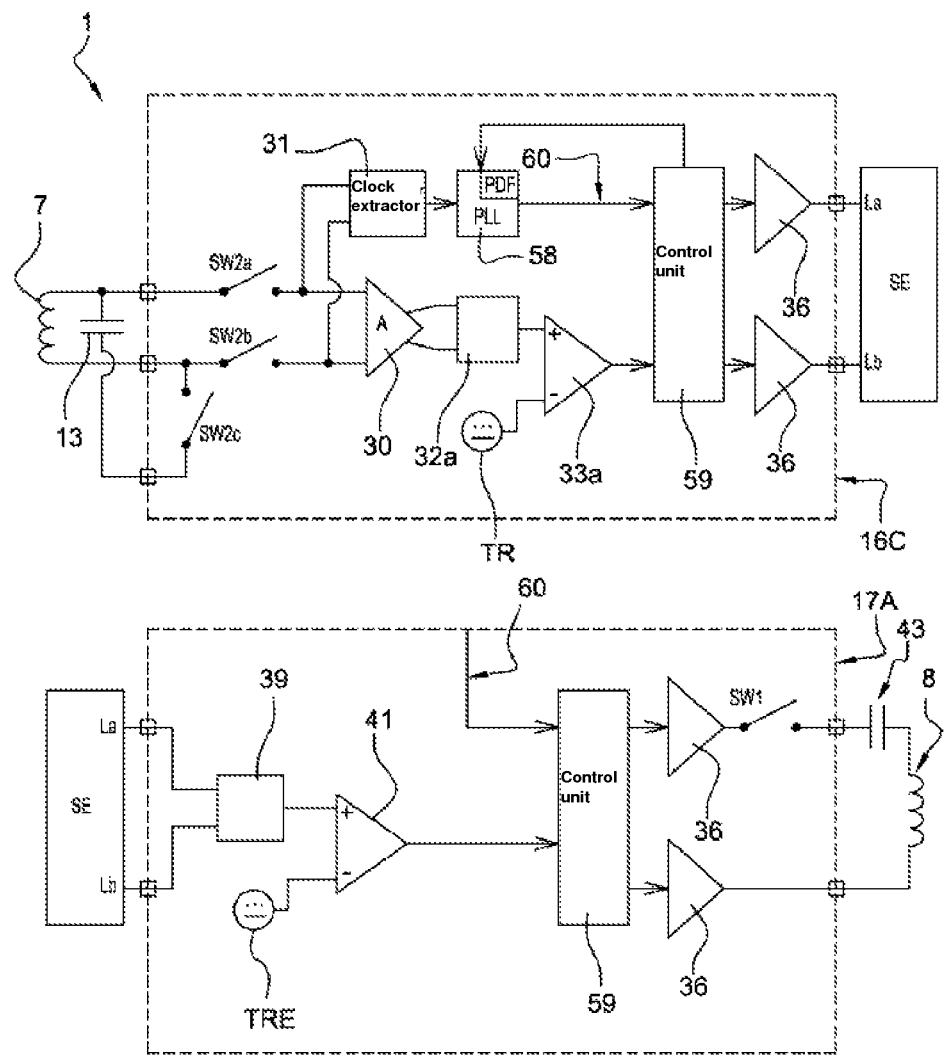
FIG. 13 shows an embodiment of the invention in which the receiving and transmitting interfaces are operational in turns, and which uses a special means for generating a transmitting electromagnetic field synchronised with the receiving field of a reader.

The antennas 7, 8 in the example include turns in a flat arrangement on a single substrate (or two separate substrates) as shown in particular in FIGS. 3 and 13.

All known means can be used to manufacture the antenna, such as engraving, wire incrustation by ultrasound, etc.

When the system is powered with a low voltage (3.3 V), the output antenna is designed to perform a serial resonance. When the system is powered with a strong current, the voltage within the total LC circuit is relatively weak, when a high voltage is present on each component L and C.

Figure 11:
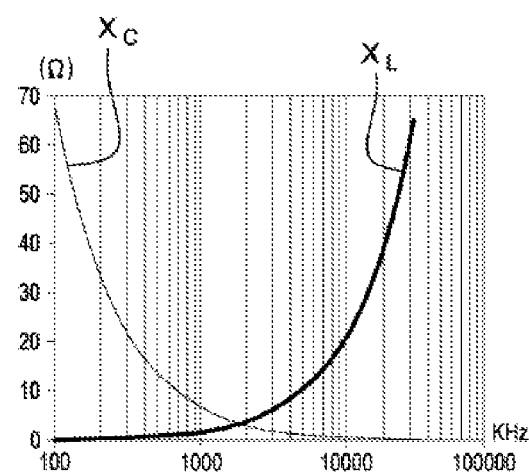
FIG. 11 shows values of the reactances $X_L$ and $X_C$ respectively according to the inductance and the capacity as a function of the frequency.

The curve depicted in FIG. 11 shows obtained reactance values $X_L$ in accordance with the inductance and thus reactance values $X_C$ in accordance with a capacitor depending on the frequency through application of the following formulas:

$$X_C = 1/(2 \cdot \pi \cdot f \cdot C) \quad X_L = 2 \cdot \pi \cdot f \cdot C$$

The reactances $X_L$ and $X_C$ are equal at the intersection point between the two curves. F is the serial resonant frequency of the circuit.

At this point, the voltage on the terminals of the LC circuit (FIG. 10) is minimal when the current intensity is maximal. Since the magnetic flux is directly dependent on the intensity of the current, this serial resonance is one way to create a high magnetic field on the transmitting antenna 8 even when the latter is powered by a low voltage.

This is a way to increase the power of the signal of the transponder 5 despite the small size of the antenna on the substrate.

Figure 12:
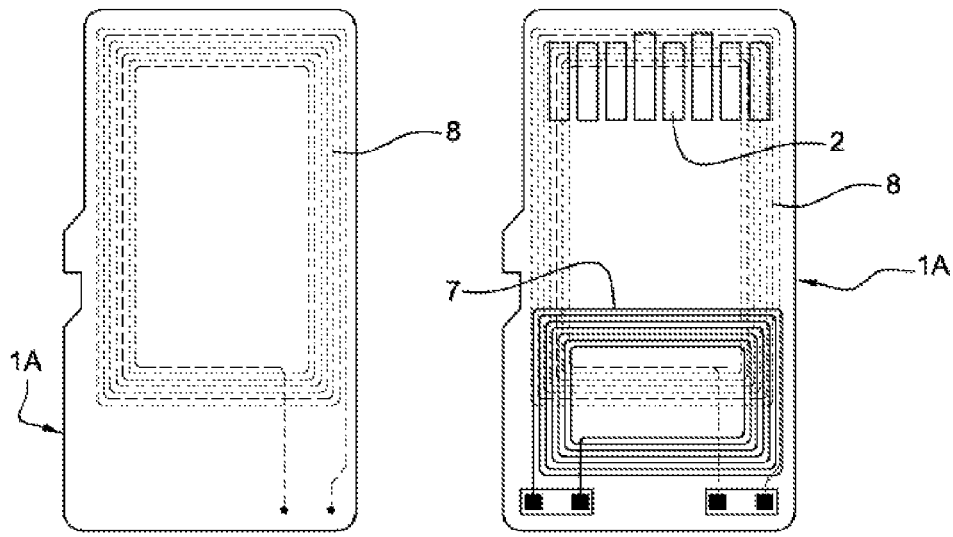
FIG. 12 shows an arrangement of a transmitting antenna relative to a Micro SD card and a mutual arrangement of the two antennas.

Specifications of the Transmitting Antenna (FIG. 12)

According to the embodiment of the invention, the circuit includes separate receiving and transmitting antennas. The antennas are arranged together such that the mutual inductance thereof is minimal or at least partially cancelled out.

The arrangement is preferably selected such as to have a minimal current induction in the receiving antenna which is, in particular, lower than the gain threshold of the receiving stage 16. For example, with a gain of 3 it is provided for arranging the antennas with one another such as to have a voltage of less than 300 mV.

In an alternative embodiment (not shown), the antennas are protected from one another by being separated from one another and/or by shielding.

In another alternative embodiment, the antennas overlap and an electronic protection means is provided, such as filters configured to prevent mutual interference.

In the advantageous embodiment, the transmitting antenna 8 is larger than the receiving antenna. The antenna is, for example, placed on the rear side of the Micro SD card, as shown in FIG. 12. The specifications thereof used in the example are: L=1.05 µH, R=939Ω, C=2.69 pF.

In order to prevent crosstalk between the antennas due to the inevitable coupling therebetween, the antennas are arranged such that the mutual inductance between the two antennas is reduced to the minimum. Various solutions are possible, in particular insulating one antenna relative to the other, deactivating one antenna while the other is active, and vice-versa.

In a preferred embodiment, said feature of minimised mutual induction is obtained by overlapping or stacking the two antennas. The receiving antenna 7, which is larger in the example, is arranged such as to have substantially one portion arranged outside of the outer periphery of the transmitting antenna. The receiving antenna 7 is preferably substantially straddling the transmitting antenna, with half on one side and within the periphery of the transmitting antenna 8 and the other half outside of the periphery of the transmitting antenna.

Thus, thanks to said special arrangement, two antennas are provided in which the resultant of the mutual inductance is zero overall, or at least minimised.

When the transmitting antenna transmits an electromagnetic field, a portion of the flux F passes in a direction X through a portion A of the antenna 7 located opposite the inside of the transmitting antenna 8, generating an induced current (i) in the antenna 7. At the same time, another portion of the flux F passes through a portion B of the antenna 7 located outside of the surface of the transmitting antenna 8 in a direction Y opposite to X, generating an induced current (j) opposite to (i).

Thus, partial overlapping of the antennas reduces at least the value of an interference caused by the transmitting antenna 8 on the receiving antenna 7.

The interference induced in the receiving antenna by the transmitting antenna cancels itself out at least to a great extent. The resultant can be substantially zero overall according to the adequate position of the antennas and the specifications thereof.

The effectiveness of self-cancellation can depend on the environment immediately outside the antenna, for example such as the metal environment of a telephone or host device of the object 1. The antennas can be on the same surface of a substrate and insulated from one another, or on opposite surfaces. The antennas can also be arranged on mutually parallel separate substrates.

The invention can contemplate implementing the following features for the described advantages:

a means for recovering or extracting from the carrier the magnetic field received in order to enable an active modulation function with no oscillator using conventional contactless chips (not NFC);

an arrangement of antennas separated with a mutual inductance of zero or almost zero, simplifying the circuit;

the implementation of two types of resonance (preferably parallel for reception and preferably serial for transmission) for increased effectiveness;

a level-adaptation circuit 16 connected to the combi chip 5 making it possible to use existing chips, in particular dual-interface chips (bank combi) which are already certified, with no modification by simplification and by industrial convenience. In particular, the invention provides for using the antenna interface La/Lb of the existing combi chip (in particular the SLE 66CLX800PE chip by the company Infineon) for modulating/demodulating;

moreover, the invention does away with the need to use an NFC chip or component, in particular with a built-in oscillator (for example, a contactless chip that complies with standard ISO/IEC 14443 and/or ISO/IEC 15693 may be used);

the circuit can include a detector configured to supply a signal representing the presence of an external magnetic field and to activate one operating mode between a contact mode and a contactless mode;

as an alternative embodiment, one and/or the other of the antennas can already be built into a host device, the circuit of the invention without the antennas simply being connected to one of the antennas via a connector (not shown) for greater adaptability of the circuit to the host devices.

Thus, the invention relates to any communication device or appliance including the circuit described above, whether removable or not.

FIG. 13 shows a preferred embodiment of the invention in which the transmitting/receiving circuits are uncoupled from one another. The components that have the same references are identical or similar to those of the other figures.

The communication circuit 1 of the invention in this case includes a transmitting 17A/receiving 16C interface (or stage) connected to two antennas 7 and 8. Said transmitting/receiving stage includes a control unit 59 for dynamic uncoupling of the antennas 7 and 8 and/or their respective resonant circuits 8, 43 and 7, 13.

Said control unit includes connections from the two stages 17B and 17A, in particular a connection 60 with the PLL unit 58.

The communication circuit 1 includes a parallel resonant receiving circuit 7 tuned by the capacitance 13 to the frequency of the carrier. The antenna 7 is connected to the device 16C.

A serial resonant transmitting circuit includes an antenna 8 tubed by the capacitance 43 substantially to the frequency of the carrier: 13.56 MHz (or to a different frequency of 14.4 MHz according to a preferred embodiment below).

In order to avoid any inductive coupling between the receiving circuit 7, 13 and the transmitting circuit 8, 43, which might considerably alter the performance of each one of the circuits according to the position of the antennas relative to one another, each resonant circuit is uncoupled voluntarily and in alternation (7, 13) and (8, 43).

According to one feature of this embodiment, the communication circuit is arranged such as to deactivate the first resonant receiving circuit 7, 13 with the first antenna 7 while the second resonant transmitting circuit 8, 43 is active, and vice-versa.

According to this principle, in this embodiment:

an analogue switch SW2c is placed in the communication circuit and makes it possible to uncouple the receiving antenna 7 from the tuning capacitance 13 and from the rest of the circuit, and two analogue switches SW2a and SW2b make it possible to uncouple 5 the receiving antenna 7 from the rest of the circuit 16C, 17A;

the transmitting antenna 8 is placed in series with the tuning capacitance 43, the whole being connected to the stage 17A via pin connections which are optionally removable or soldered.

An analogue switch SW1 placed in the stage 17B makes it possible to uncouple the transmitting antenna from the rest of the transmitting circuit (A), in particular at one of the amplifiers or output buffers 36.

It should be noted that in one embodiment, it is possible not to include the analogue switch SW1. The resonant circuit can be opened, for example, by placing at least one of the output buffers 36 in high impedance mode (HiZ).

The device operates as follows under the control of the control unit 59 which is common to the two stages 16C and 17A:

In receiving mode (default mode here, or when inoperative in this example), the analogue switch SW1 is open in order to uncouple the serial resonant circuit 8, 43. The analogue switches SW2a, SW2b and SW2c, on the other hand, are closed in order to receive as much of the SEE field as possible.

In transmitting mode, the analogue switches SW2a, SW2b and SW2c are open in order to uncouple the parallel resonant circuit 7, 13. The analogue switch SW1, on the other hand, is closed in order to transmit as much of the SEE field as possible.

This embodiment thus enables the receiving circuit to be deactivated during the transmission of frames, which implies the temporary loss of the clock signal of the incident field. And yet, in the context of an activated contactless communication device according to the invention, the device must be synchronised with the clock of the field in order to be able to transmit synchronous frames.

For this purpose, the device according to this preferred embodiment can preferably comprise a phase-locked loop (PLL) 58 in this case placed downstream from the clock extraction circuit 31 making it possible to conserve the clock of the incident field artificially when the parallel resonant circuit is uncoupled.

Furthermore, in order to limit a possible desynchronisation of the PLL over time linked to the loss of the clock (reference signal of the PLL), the device can preferably voluntarily deactivate a phase/frequency detector of the PLL during the transmission mode, which then runs in free mode.

For example, a response signal from the chip SE arrives at the control unit, which is detected in order to deactivate the phase detector PFD in transmitting mode.

The logic control unit 59 is capable of inhibiting the reception and transmission by engaging with the switches as explained above. The switches SW2a, SW2b and SW2c can be closed by default (in receiving mode) while SW1 is in open position, and then during the transmission of a response by the chip SE, the control unit detects a response signal of the chip and can cause a transmission configuration as below.

The control unit 59 controls the switching of the switches SW1 and (SW2a, SW2b, SW2c) in order to be in closed and open position, respectively, controls the deactivation of the phase/frequency detector PFD of the PLL component 58 during the transmitting mode, and makes it possible to supply the carrier frequency of the PLL unit 58 in order to generate pulses.

At the end of the transmission, the control unit operates in the opposite direction and places the switches in default position for a receiving mode.

Furthermore, advantageously, the inventors have found that the tuning frequencies of the receiving circuit and the transmitting circuit should preferably be different, respectively centred on 13.56 MHz for receiving and 14.4 MHz for transmitting, in order to promote communication.

As an alternative, the communication circuit can be arranged such that the first and second antennas form a single antenna.

Said configuration can be advantageous in terms of simplifying the construction of the antenna, the costs of an optional printed circuit of a double-sided antenna, in order to avoid problems relating to the size of the available surfaces of the antenna substrates intended for receiving electronic/electric components.

The resonant transmitting and/or receiving circuit can include one or two capacitances for the resonant transmitting circuit and/or the resonant receiving circuit. The controller 59 can control the switching of at least one capacitance or a plurality thereof in order to form two resonant circuits with a single antenna. Such an assembly and the serial and/or parallel assembly alternatives are known in the prior art. A system for switching between serial/parallel resonant circuits is known, for example, from patent EP 0 926 855 mentioned in the introduction.

The invention claimed is:

1. Activated contactless communication circuit of a first device that communicates with a second device, the first device including electromagnetic field receiver and emitter circuits that receive and transmit data from and to the second device with which it communicates, said electromagnetic field receiver and emitter circuits respectively including a first circuit resonating with a first antenna configured to receive data and a second circuit resonating with a second antenna configured to transmit a carrier frequency modulated with data, said first and second resonant circuits being different from one another, wherein said transmission by said second circuit is carried out with a carrier frequency that is phase-synchronised with the frequency of the electromagnetic field received by the first circuit.

2. Communication circuit according to claim 1, wherein the synchronised emitter circuit is configured to modulate a carrier signal derived or extracted from an electromagnetic field for receiving data.

3. Circuit according to claim 1, wherein the communication circuit is configured to communicate a contactless transponder response according to at least one of the standards ISO/IEC 14443, 15693 or 18092.

4. Circuit according to claim 1, wherein said antennas are arranged together such that the mutual inductance thereof is minimised by the separation or attenuation thereof or at least partially cancelled out, such as to have negligible current induction in the receiving antenna caused by the transmitting antenna.

5. Circuit according to claim 4, wherein the two antennas are partially opposite one another, arranged on two substantially parallel horizontal planes.

6. Circuit according to claim 1, wherein the receiving antenna is part of a parallel resonant circuit and/or the transmitting antenna is part of a serial resonant circuit.

7. Circuit according to claim 6, wherein the serial resonance antenna circuit produces a minimum current of 60 mA to 80 mA with the supply voltage provided.

8. Circuit according to claim 1, further including a contactless chip for receiving a signal and a stage of adapting the reception capable of adapting the received signal to the chip and/or of extracting a synchronised carrier signal from the received signal.

9. Circuit according to claim 1, wherein the communication circuit is installed in or forms an object having the form factor of an integrated circuit card or a Micro SD card.

10. Circuit according to claim 1, wherein the communication circuit is arranged such as to deactivate the first resonant circuit with the first antenna while the second resonant circuit with the second antenna is active, and vice-versa.

11. Circuit according to claim 10, further including a phase-locked loop which makes it possible to conserve the clock of the incident field artificially when the parallel resonant circuit is uncoupled.

12. Circuit according claim 10, wherein the first and second antennas form a single antenna.

13. Circuit according to claim 12, wherein the receiving and transmitting tuning frequencies are substantially different, centred on 13.56 MHz and 14.4 MHz, respectively.

14. Communication device or appliance including the communication circuit according to claim 1.

15. A method of operating a first device that communicates with a second device, the first device comprising an activated contactless communication circuit including steps of:
  receiving an electromagnetic field carrying data from the second device with which it communicates, and
  transmitting a carrier frequency modulated with data to the second device with which it communicates,
  wherein the step of receiving data is carried out by a first resonant circuit with a first antenna and the step of transmitting the carrier frequency modulated with data is carried out by a second resonant circuit with a second antenna, said first and second resonant circuits being different from one another,
  and wherein said transmission takes place with a carrier frequency that is phase-synchronised with the frequency of the electromagnetic field received by the first circuit.

16. An electronic object that is configured for activated communication with a reader, comprising:
  an electromagnetic field receiver circuit connected to a first antenna that receives an electromagnetic field from the reader, the electromagnetic field receiver circuit operating to obtain a carrier signal from data contained in the received electromagnetic field, and
  an electromagnetic field emitter circuit connected to a second antenna for transmitting a modulated electromagnetic field to the reader, the electromagnetic field emitter circuit being different from the electromagnetic field receiver circuit, and operating to:
  modulate the carrier signal with data to be transmitted to the reader,
  phase shift the carrier signal to synchronize it with the frequency of the electromagnetic field received from the reader, and
  transmit, with predetermined power, the phase-synchronized, modulated carrier signal to the reader.

* * * * *